United States Patent [19]
Gérard

[11] Patent Number: 4,883,725
[45] Date of Patent: Nov. 28, 1989

[54] SUPPORT FRAME FOR STORAGE BATTERY CELLS

[75] Inventor: Claude Gérard, Le Bouscat, France

[73] Assignee: Saft S.A., Romainville, France

[21] Appl. No.: 284,493

[22] Filed: Dec. 15, 1988

[30] Foreign Application Priority Data

Feb. 22, 1988 [FR] France ................. 88 02083

[51] Int. Cl.⁴ ............................................ H01M 2/10
[52] U.S. Cl. .................................... 429/99; 429/159; 180/68.5
[58] Field of Search .................. 429/99, 159, 148; 180/68.5

[56] References Cited

U.S. PATENT DOCUMENTS

| | | | |
|---|---|---|---|
| 1,304,588 | 5/1919 | Monahan | 429/99 |
| 1,543,017 | 6/1925 | Lea | 429/99 |
| 2,031,508 | 2/1936 | Scott | 180/68.5 |
| 2,942,058 | 6/1960 | Herold | 429/99 |
| 3,623,917 | 11/1971 | Chassoux | 429/148 |
| 4,065,603 | 12/1977 | Coibion | 429/99 |
| 4,113,926 | 9/1978 | McBrien | 429/99 |
| 4,203,519 | 5/1980 | Fujitaki | 206/387 |

FOREIGN PATENT DOCUMENTS

| | | | |
|---|---|---|---|
| 1080584 | 12/1954 | France | . |
| 1176216 | 4/1959 | France | . |
| 1470408 | 1/1967 | France | 429/99 |
| 2344133 | 10/1977 | France | . |

Primary Examiner—Donald L. Walton
Attorney, Agent, or Firm—Kenyon & Kenyon

[57] ABSTRACT

A support frame (1) for storage battery cells individually enclosed in cases (11) made of molded insulating synthetic material, the frame is constituted of a metal box comprising at least two side longitudal members (2, 3), two frame end plates (4, 5) interconnecting the ends of the side longitudinal members, and at least one element (6) for supporting said cases when said frame is lifted, two facing side longitudinal members each including a flexible wall (9, 10) which is semi-free, and sloping slightly relative to the vertical so as to narrow the passage into the frame when going down towards the bottom of the frame, and the bottom ends of said flexible walls co-operating ratchet-like with longitudinal projections (12, 13) or grooves carried by the cases of said cells on pairs of opposite faces and preventing the cases from being extracted once inserted even in the event of said frame being turned upsidedown.

3 Claims, 3 Drawing Sheets

SUPPORT FRAME FOR STORAGE BATTERY CELLS

The present invention relates to a support frame for storage battery cells.

The invention is particularly applicable to storage batteries mounted on vehicles. E.g. locomotives, railway cars, road trucks, etc.

BACKGROUND OF THE INVENTION

In a conventional prior disposition, each unit cell of the storage battery is enclosed in a case, and a plurality of cells, and thus a plurality of cases, are assembled together in a frame which generally contains about four to six cells. The battery is made up of several frames clamped together against a wall by means of an assembly bar co-operating with tie bars.

In a prior system of this nature, cell cases are made of metal and the frames are made of wood. Within the frames, the cases do not stand on the bottoms of the frames but are suspended from the side walls by studs projecting from the faces of the cases of the cells, with the studs penetrating into corresponding holes in the side walls of the frames. This disposition serves firstly to prevent the cases from standing on the bottom and secondly to keep the cases spaced apart by appropriate gaps. This disposition is made necessary by the metal nature of the cases in order to isolate them from one another which is necessary if conducting paths may be produced between the cases by dirt, objects, etc.

However, it is now possible to make cases of molded plastic material which means that it is possible to design other dispositions for the frames avoiding certain insulating constraints and consequently, in particular, enabling bulk to be reduced.

Thus, a disposition is known in which a plurality of cells: e.g. four, five, or six; are received in a single one-piece plastic case. In this case there is no need for a frame. This disposition considerably reduces bulk, but it suffers from the drawback of requiring an entire one-piece case to be replaced with all of its cells in the event of a single cell becoming faulty.

In another disposition, each cell is situated in a plastic case which includes half dovetails on four of its vertical sides, thereby enabling an indefinite sequence of such cases to be assembled together by sliding assembly tongues over pairs of meeting half-dovetails on each side of a pair of cases placed adjacent to each other, and by preventing the cases from moving vertically relative to one another by folding over the bottom ends of the tongues against the bottom ends of the dovetails, with the top ends of the tongues being previously curved. At each end of a sequence formed in this way, e.g. a sequence of five cases, a plate including a handle for transport purposes is slid over the two half-dovetails situated on either side of the end face of the end case.

This disposition also avoids the use of a frame and makes it possible to reduce bulk while still retaining the possibility of interchanging a single cell without having to change a plurality of cells, as in the preceding disposition. However, this disposition requires a plurality of small pieces for assembly purposes, and such pieces may firstly be mislaid, and secondly they lengthen assembly time. Further, the half dovetails molded on the plastic cases do not always have sufficient mechanical strength.

The object of the present invention is to provide a support frame for storage battery cells which are individually enclosed in respective cases of molded insulating synthetic material, providing reduced bulk compared with frames for metal-cased storage batteries, and requiring no assembly pieces for assembling n cells in a frame and for holding them therein (other than the inter-cell electrical connection strips), and enabling the frame to be turned upsidedown without causing the cases to fall out therefrom. In addition, the frame provides considerable mechanical strength.

SUMMARY OF THE INVENTION

The present invention provides a support frame for storage battery cells individually enclosed in cases made of molded insulating synthetic material, the frame being constituted by a metal box comprising at least two side longitudinal members, two frame end plates interconnecting the ends of the side longitudinal members, and at least one element for supporting said cases when said frame is lifted, two facing side longitudinal members each including a flexible wall which is semi-free and sloping slightly relative to the vertical so as to narrow the passage into the frame when going down towards the bottom of the frame, and the bottom ends of said flexible walls co-operating ratchet-like with longitudinal projections or grooves carried by the cases of said cells on pairs of opposite faces and preventing the cases from being extracted once inserted even in the event of said frame being turned upsidedown.

In order to enable the cells to be easily extracted from the frame, said flexible walls advantageously stop short from one of the ends of the frame over a length which is not less than the length of the case of a cell.

BRIEF DESCRIPTION OF THE DRAWINGS

An embodiment of the invention is described by way of example with reference to the accompanying drawings, in which.

MORE DETAILED DESCRIPTION

Figure 1:
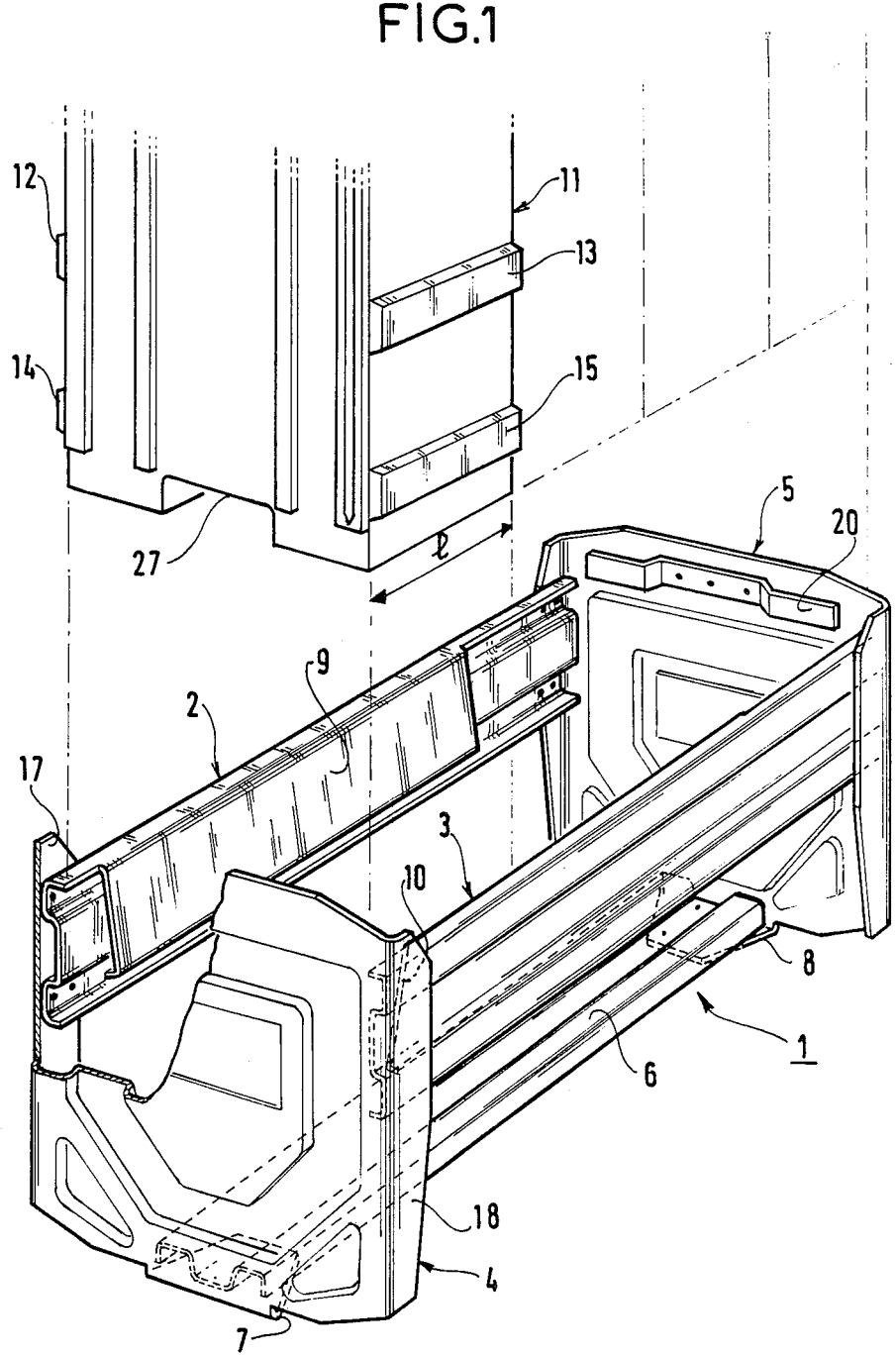
FIG. 1 is a perspective view showing a frame in accordance with the invention and a portion of the case of a storage battery cell.
Figure 3:
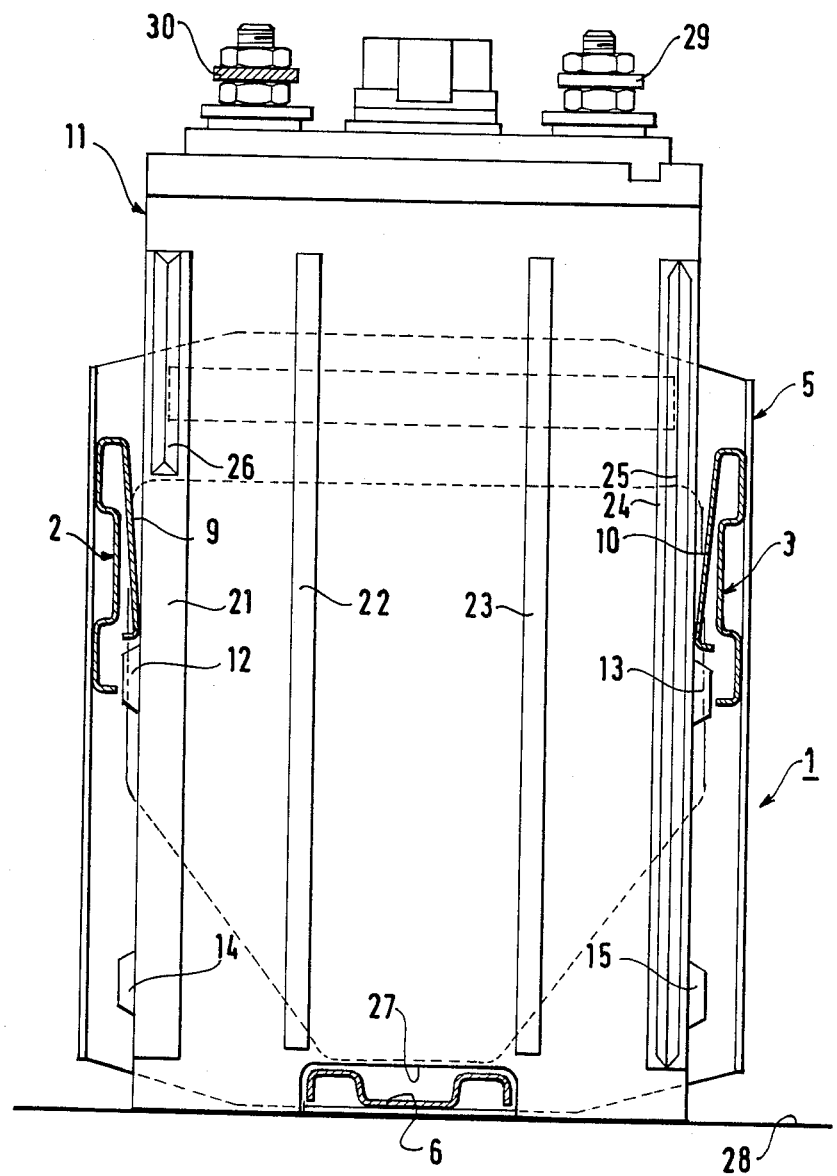
FIG. 3 is a section on line III—III of FIG. 2.

As can clearly be seen in FIG. 1, a frame in accordance with the invention constitutes a metal box 1, e.g. made of stainless steel, comprising two side longitudinal members 2 and 3, two frame end plates 4 and 5 welded to the ends of the side longitudinal members, and a bottom bar 6 welded at its ends to the bottoms of the frame end plates 4 and 5 at folded-back tongues 7 and 8 at the bottoms of the frame end plates. The side longitudinal members 2 and 3 include respective internal flaps 9 and 10. These flaps are integral portions of the section bars from which the longitudinal members are constituted and they provide flexible internal walls that are semi-free in that said walls are not fixed at their ends and thereby provide a degree of flexibility. The flaps 9 and 10 slope at a small angle relative to the vertical so as to reduce the inside width between the two longitudinal members 2 and 3 when going down towards the bottom of the frame. FIG. 1 also shows a fragmentary perspective view of a case 11 made of injected insulating plastic material and containing a cell of a storage bettery. As can be seen, the case has two longitudinal projections 12 and 13 on two of its opposite faces so that when the case 11 is inserted into the frame 1, said projections cooperate with the flaps 9 and 10 by pushing them apart as the projections 12 and 13 go past, with the flaps serving as ratchets preventing a case from being removed once the projections have gone past the flaps. The longitudinal projections 12 and 13 could optionally be replaced by grooves. This position is shown in FIG. 3 where it can be seen that the projections 12 and 13 prevent the case from being removed upwardly because of the flaps 9 and 10. It can be seen from FIGS. 1 and 3 that the case also includes two other projections 14 and 15. The sole purpose of these projections is to ensure that various rows of cases bear properly against one another when the cases are not placed in frames in vehicles, but are disposed, for example, in a fixed location that does not require any kind of frame. It is thus preferable, in this case, for the various touching rows of cases to make contact with one another along two superposed projections rather than along a single projection.

As can be seen, the frame 1 is constituted by a one-piece item and the cases are mounted in the frame without requiring any intermediate pieces, since the cases are inserted into the frame from above and then snap-fastened therein by virtue of the projections 12 and 13 co-operating with the flaps 9 and 10. The frame can be turned upsidedown without the cases falling out. However, in order to facilitate removal of a case from the frame, the flaps 9 and 10 do not extend over the entire length of the side longitudinal members 2 and 3, but at one of the ends (to the right in FIGS. 1 and 2) these flaps are interrupted over a length of not less than the length l of the case of a storage battery cell. In this configuration, the storage battery case located in the frame adjacent to this end is nevertheless held vertically in position by virtue of the connection strip 16 interconnecting the terminals of two consecutive cells. It may be observed that the flaps 9 and 10 are interrupted at the other end as well before reaching the ends of the side longitudinal members 2 and 3. This interruption is short, and less than the length l of a case, and serves solely for leaving room to pass the welding electrodes for welding the longitudinal members against the sides 17 and 18 of frame end plate 4.

Bars 19 and 20 are welded to the top ends of the frame end plates 4 and 5 for connection to handles (not shown) for use in lifting the assembly.

Figure 2:
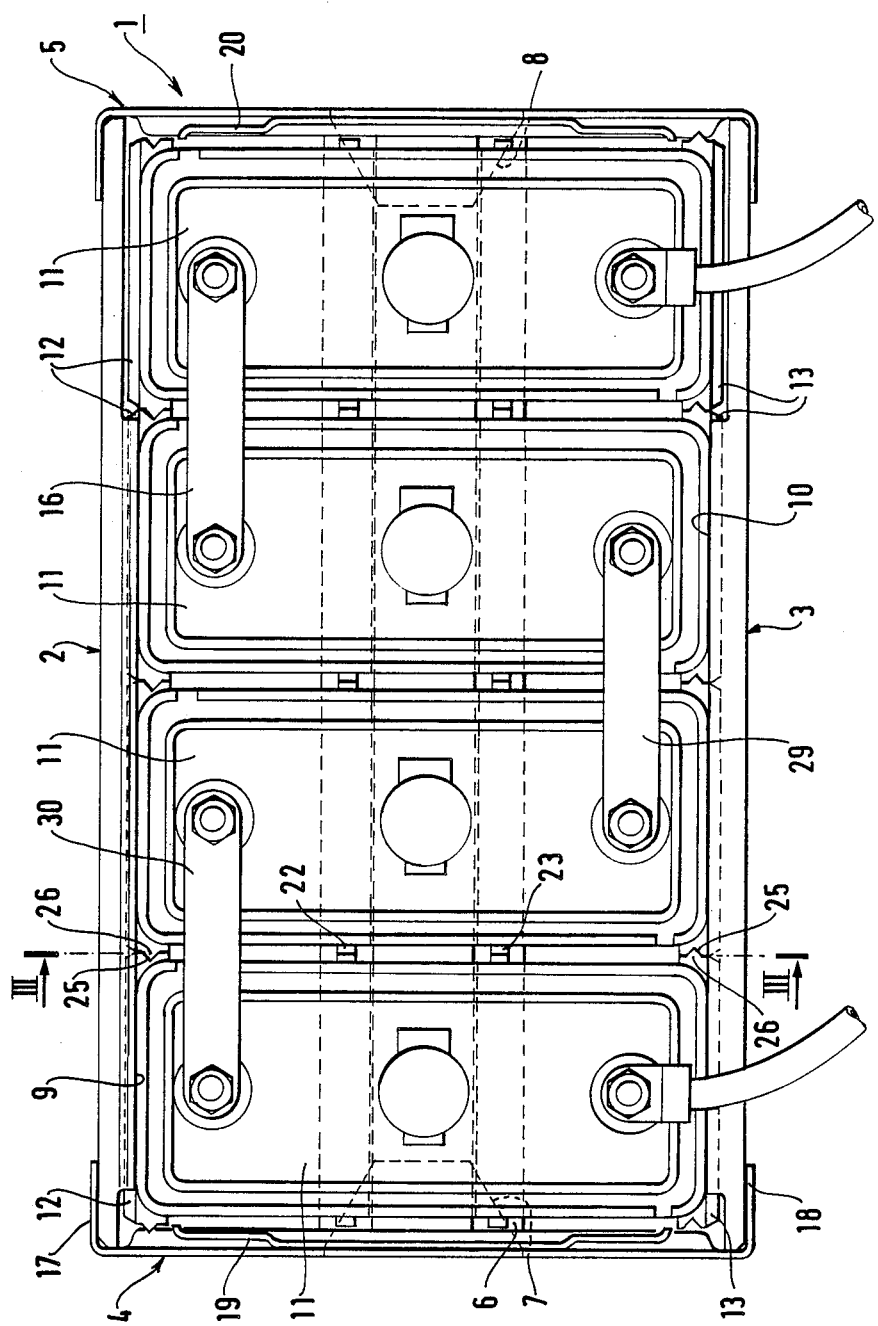
FIG. 2 is a plan view showing the frame having four storage battery cases placed therein.

The vertical faces of the cases 11 that do not have the projections are nevertheless provided with vertical ribs 21, 22 23, and 24. Rib 24 includes a groove 25 and rib 21 includes a tenon 26 at its top end. On opposite faces, the tenon and the groove are the other way round. Thus, as can be seen in Figure 2, the various cases are held relative to one another by a small amount of interfitting.

As can be seen in FIGS. 1 and 3, the bottom end of case 11 includes a recess 27 whose vertical extent is greater than the vertical extent of the bottom section bar 6 such that when the frame stands on a place 28, the cases 11 also stand on the plane rather than standing on the bottom bar 6 which serves to support the cases only when the frame is lifted.

No intermediate assembly pieces are therefore required for assembling storage battery cases in the frame, and they therefore cannot be lost or contribute to lengthening the time required for assembly. Only the electrical connections by means of strips 16, 29, and 30 remain to be provided, but these cannot be avoided in any case.

I claim:

1. A support frame for storage battery cells individually enclosed in cases made of molded insulating synthetic material, the frame being constituted by a metal box comprising at least two side longitudinal members, two frame end plates interconnecting the ends of the side longitudinal members, and at least one element for supporting said cases when said frame is lifted, two facing side longitudinal members each including a flexible wall which is semi-free and sloping slightly relative to the vertical so as to narrow the passage into the frame when going down towards the bottom of the frame, and the bottom ends of said flexible walls co-operating ratchet-like with longitudinal projections or grooves carried by the cases of said cells on pairs of opposite faces and preventing the cases from being extracted once inserted even in the event of said frame being turned upsidedown.

2. A frame according to claim 1, wherein said element is constituted by a section bar having its ends connected to the bottoms of said frame end plates.

3. A frame according to claim 1 or 2, wherein said flexible walls stop short from one of the ends of the frame over a length which is not less than the length of the case of a cell.

* * * * *